United States Patent [19]
Guthrie et al.

[11] Patent Number: 5,601,380
[45] Date of Patent: Feb. 11, 1997

[54] QUICK DISCONNECT COUPLING DEVICE

[75] Inventors: Jeffrey A. Guthrie, Birdsboro; James C. Stiles, Shillington, both of Pa.

[73] Assignee: Neapco, Inc., Pottstown, Pa.

[21] Appl. No.: 503,594

[22] Filed: Jul. 18, 1995

[51] Int. Cl.$^6$ ............................ A01B 71/06; F16B 21/00
[52] U.S. Cl. ............................................ 403/359; 403/328
[58] Field of Search .................................. 403/328, 325, 403/359

[56] References Cited

U.S. PATENT DOCUMENTS

| | | |
|---|---|---|
| 3,357,206 | 12/1967 | Christie . |
| 3,480,310 | 11/1969 | McElwain . |
| 3,551,013 | 12/1970 | Trojanowski et al. . |
| 3,822,951 | 7/1974 | Bornzin .................. 403/325 X |
| 3,926,532 | 12/1975 | Schlenker et al. .................. 403/328 X |
| 4,289,414 | 9/1981 | Recker . |
| 4,402,626 | 9/1983 | Recker ........................ 403/328 |
| 4,603,998 | 8/1986 | Bober et al. ..................... 403/359 X |
| 4,616,952 | 10/1986 | Schott ........................... 403/316 |
| 4,639,163 | 1/1987 | Buthe et al. ..................... 403/322 |
| 4,775,269 | 10/1988 | Brix . |
| 4,859,110 | 8/1989 | Dommel .......................... 403/328 X |

Primary Examiner—Anthony Knight
Attorney, Agent, or Firm—Woodcock Washburn Kurtz Mackiewicz & Norris

[57] ABSTRACT

A coupling device for connecting an externally splined shaft having a circumferential groove therein to an internally splined member. The internally splined member has a plurality of radial openings in the sides thereof which receive a corresponding plurality of balls for protrusion between the splines in the groove in the externally splined shaft. A twist collar is positioned on the internally splined member and is rotatable through a predetermined angle. The twist collar has cam structure extending around the interior periphery with a plurality of dwells at spaced locations corresponding to the plurality of radial openings in the sides of the internally splined member. An inclined cam surface interconnects two adjacent dwells and is positioned to engage one of the balls during rotation of the twist collar to force the one ball into the groove in the externally splined shaft. A torsion spring connects the internally splined member and the twist collar and is constructed for rotation through the predetermined angle. The coupling device is normally in its locked position and is rotatable by an operator to an open position for installation of the internally splined member with respect to the externally splined shaft.

9 Claims, 3 Drawing Sheets

QUICK DISCONNECT COUPLING DEVICE

BACKGROUND OF THE INVENTION

The present invention relates to a quick disconnect coupling device suitable for connecting an externally splined power take-off shaft to a corresponding internally splined yoke with a universal joint and particularly to a coupling device which incorporates a twist collar having an internal torsion spring rotatable through a predetermined angle for automatically locking the device axially onto the shaft by way of one locking ball.

The problem of coupling one shaft to another for transmitting a torque force is a problem that has long existed in the agricultural industry. Agricultural tractors are normally equipped with a splined power take-off shaft to which the shaft of a towed or mounted agricultural implement is connected by means of a coupling mechanism which conventionally includes an internally splined member mating with the splined power take-off shaft and having a universal joint. Such mechanisms also generally include a releasable lock for preventing the inadvertent axial separation of the mating splined members. One example of such torque transmitting coupling is disclosed in U.S. Pat. No. 4,859,110—Dommel.

The present coupling device provides a simplified inexpensive mechanism utilizing a single acting cam surface engageable by a single locking ball that insures a tight lock-up on the power take-off shaft as the mating splined parts wear. The present coupling device in addition to housing the single acting cam surface includes a torsional spring constructed so as to use the interior cylindrical surface of the twist collar and the outside cylindrical surface of the internally splined member as stops which define the predetermined angle through which the spring may be rotated.

SUMMARY OF THE INVENTION

The present invention relates to a coupling device suitable for connecting an externally splined shaft having a circumferential groove therein to an internally splined member. The coupling device comprises an internally splined member having a plurality of radial openings in the sides thereof and a plurality of balls carried by the respective openings in the internally splined member for protrusion between the splines in the grooves in the externally splined shaft. The coupling device further includes a twist collar positioned on the internally splined member and rotatable through a predetermined angle relative thereto. The twist collar has therein cam structure extending around the interior periphery of the twist collar. The cam structure has a plurality of dwells at spaced locations corresponding to the plurality of radial openings in the sides of the internally splined member and an inclined cam surface inter-connects two adjacent dwells. The cam surface is positioned to engage one of the balls during rotation of the twist collar to force the one ball into the groove in the externally splined shaft. A torsion spring is positioned on the internally splined member between the outer surface thereof and the inner surface of the twist collar. One end of the torsion spring is connected to the internally splined member and the other end of the torsion spring is connected to the twist collar. The torsion spring is constructed for rotation through the predetermined angle. The torsion spring stopping against the inner surface of the twist collar at installation to provide a first stop to permit the operator to determine how far to rotate the twist collar to cause the balls to be aligned with the dwells in the insert before bringing the internally splined member into engagement with the externally splined shaft and the torsion spring stopping against the outer circumference of the internally splined member when the twist collar is rotated in the opposite direction provides a second stop so that the cam structure is prevented from rotating past the second stop in the driving direction after the twist collar has been released by the operator and the cam surface has forced the one ball into the groove in the externally splined shaft thereby preventing axial movement between the shaft and the internally splined member.

It is another object of the invention to provide a coupling device having a mechanism incorporating a single acting cam surface that cooperates with a single ball for ensuring a tight lock-up on the power take off shaft as the splined parts wear.

Other objects and advantages of the invention will become apparent from the following detailed description of the invention taken in conjunction with the accompanying drawings.

PREFERRED EMBODIMENT OF THE INVENTION

Figure 3:
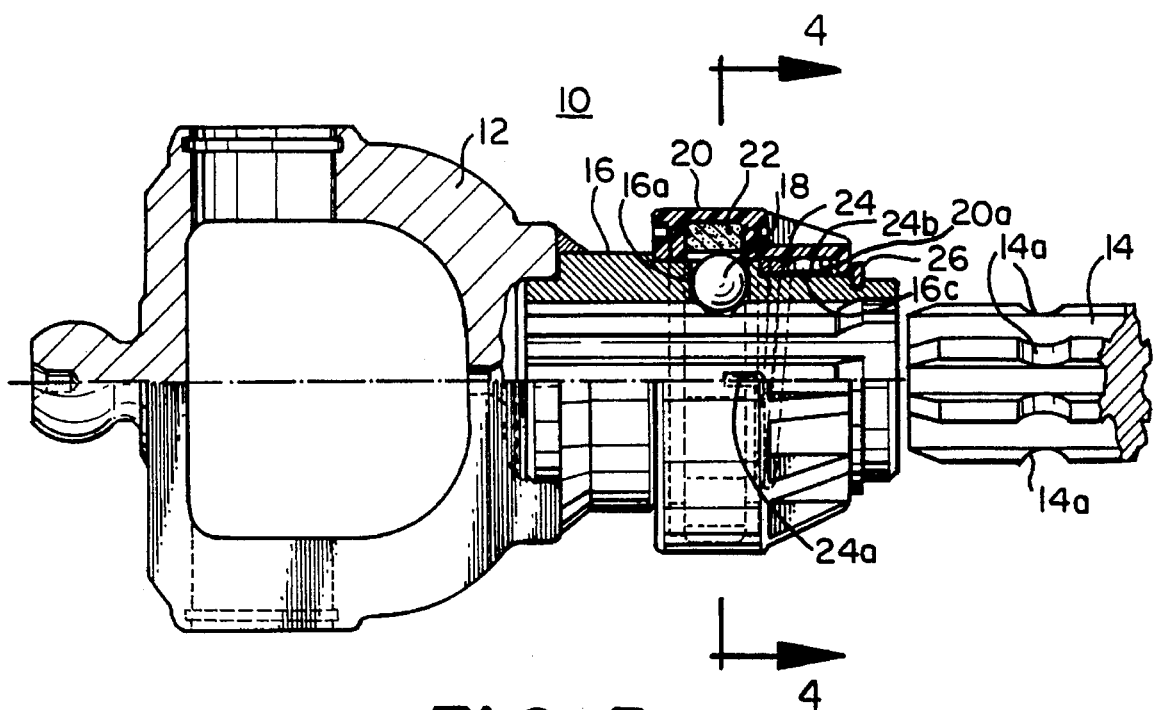
FIG. 3 is a side elevation partly in section of the coupling device illustrated in FIGS. 1 and 2.
Figure 1:
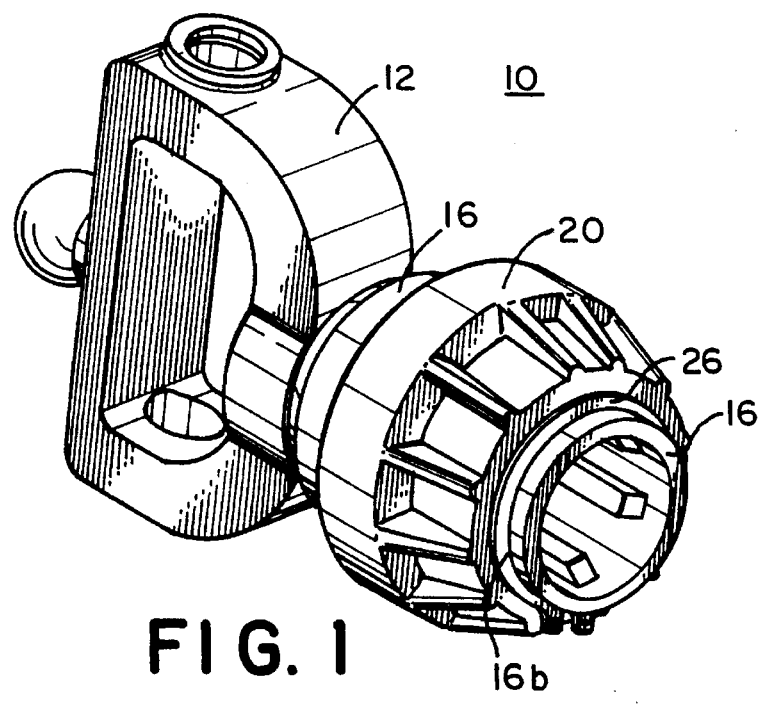
FIG. 1 is a perspective view of a coupling device embodying the present invention.

Referring to FIGS. 1 and 3, the coupling device 10 embodying the present invention has been shown in connection with a driven member in the form of a yoke 12 which is adapted for attachment to a universal joint. The coupling device 10 is secured to the yoke 12 in any suitable manner and preferably by welding. The coupling 10 is suitable for connecting an externally splined drive shaft such as a power take-off shaft 14 having a circumferential groove 14a therein by way of an internally splined member to the yoke 12. The circumferential groove is adapted to receive a plurality of locking elements or balls as hereinafter described.

Figure 2:
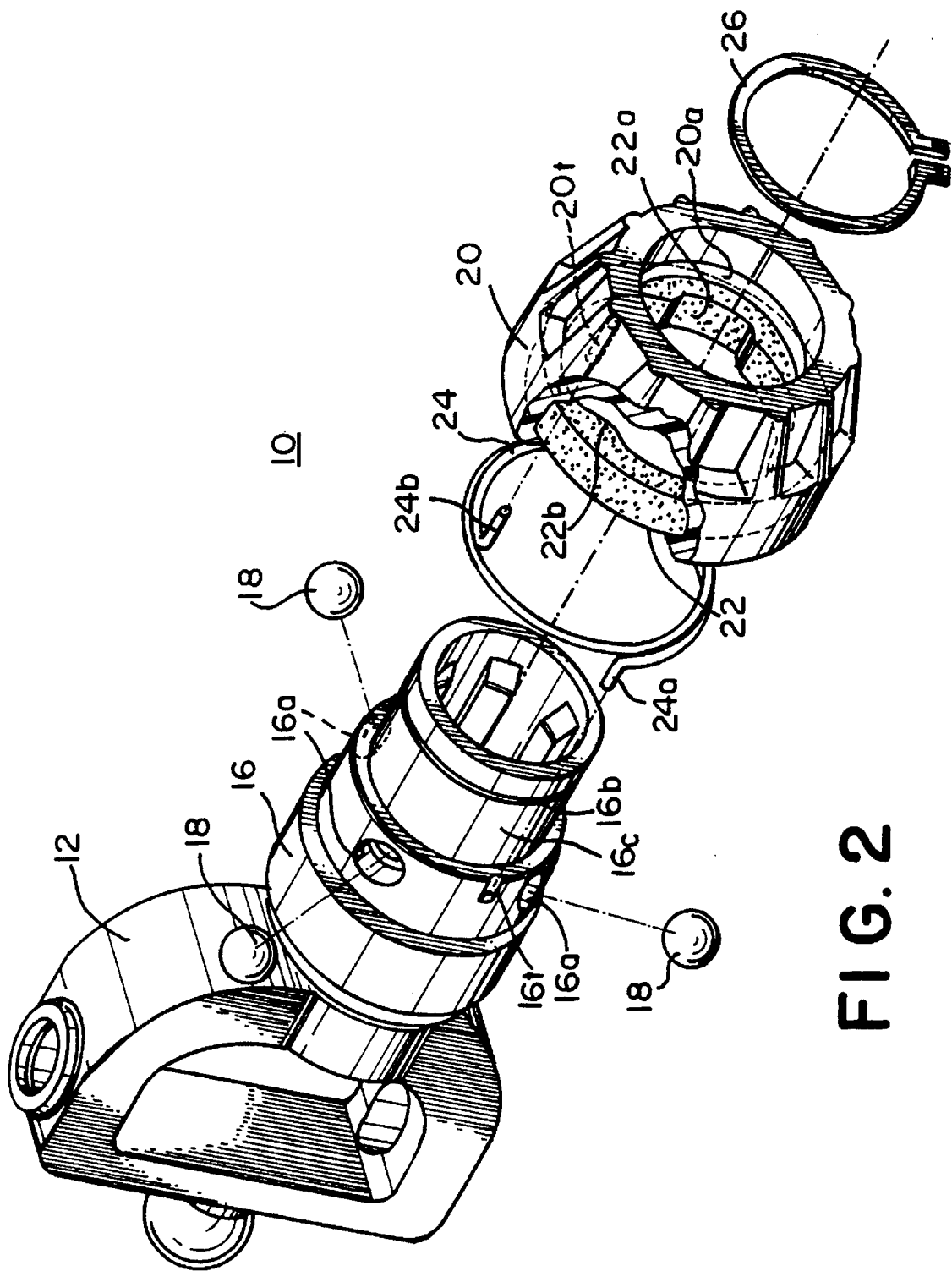
FIG. 2 is a exploded perspective view of the coupling device illustrated in FIG. 1.
Figure 4A:
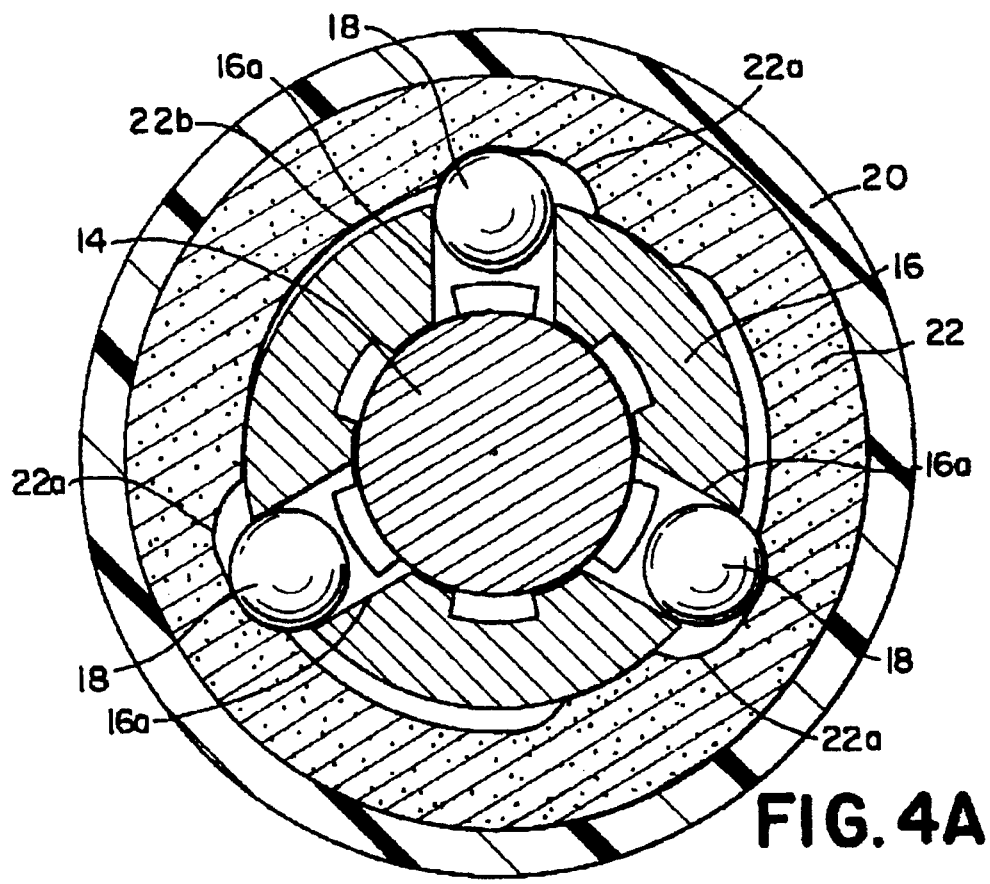
FIGS. 4A and 4B are sectional views taken along the lines 4—4 in FIG. 3 showing the coupling device in unlocked and locked condition.
Figure 4B:
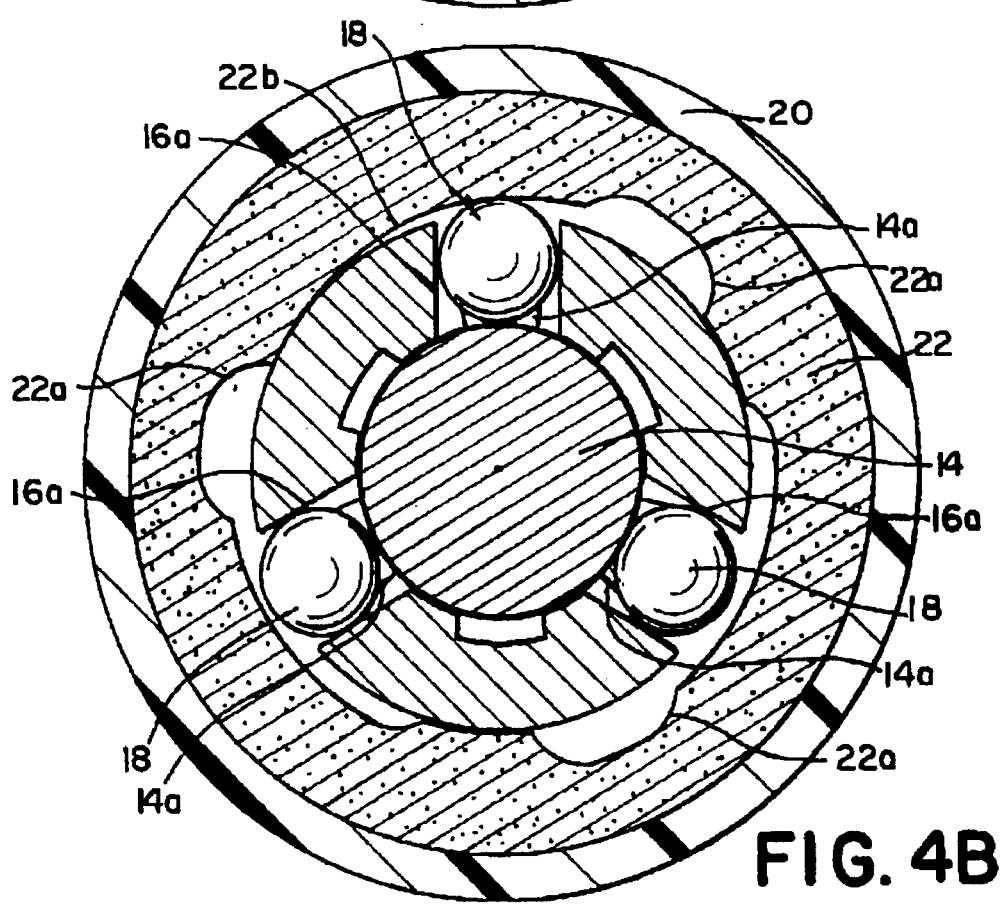

The coupling device 10 comprises an internally splined member 16 having a plurality of radial openings 16a in the sides thereof. The member 16 preferably is made of steel. The radial openings 16a are constructed for receiving and carrying a corresponding plurality of balls 18 for protrusion between the splines into the groove 14a in the externally splined shaft 14. The coupling device 10 also includes a twist collar 20 positioned on the internally splined member 16 and rotatable through a predetermined angle relative thereto. The twist collar 20 has located therein cam structure 22 extending around the interior periphery of the twist collar. The cam structure 22 has a plurality of dwells 22a at spaced locations corresponding to the plurality of radial openings 16a in the sides of the internally splined member 16. This is best seen in FIGS. 4A and 4B. The cam structure 22 also includes an inclined cam surface 22b interconnecting two adjacent dwells 22a. The cam surface 22b is positioned to engage one of the balls 18 during rotation of the twist collar 20 in a clockwise direction from the unlocked position of FIG. 4A to the locked position of FIG. 4B to force the one ball 18 into the groove 14*a* in the externally splined shaft 14. The coupling device 10 also includes a torsion spring 24, FIG. 3, positioned on the internally splined member 16 between the outer surface thereof and the inner surface of the twist collar 20. One end 24*a* of the torsion spring 24, FIG. 2, is connected to the internally splined member 16 at 16*t* and the other end 24*b* of the torsion spring 24 is connected to the twist collar 20 at 20*t*. The torsion spring 24 normally biases the coupling device 10 to the locked position as shown in FIG. 4B. A lock ring 26, FIG. 3, fits in a groove 16*b*, FIG. 2, on the free end of the internally splined member 16 to hold the twist collar 20 in place.

The torsion spring 24 is constructed for rotation in a counterclockwise direction through the predetermined angle with the torsion spring 24 stopping against the inner surface 20*a* FIGS. 2 and 3, of the twist collar 20 at installation to provide a first stop to permit the operator to determine how far to rotate the twist collar 20 to cause the balls 18 to be aligned with the dwells 22*a* in the cam structure 22 before bringing the internally splined member 16 into engagement with the externally splined shaft 14. This corresponds to the unlocked position of the coupling device 10 as shown in FIG. 4A. The torsion springs 24 stops against the outer circumference 16*c* of the internally splined member 16 when the twist collar 20 is rotated in the opposite direction by the torsion spring 24 to provide a second stop so that the cam structure 22 is prevented from rotating past the second stop in the driving direction after the twist collar 20 has been released by the operator and the cam surface 20*b* has forced the one ball 18 into the groove 14*a* in the externally splined shaft 14 thereby preventing axial movement between the shaft 14 and the internally splined member 16.

It will be noted that the cam structure 22 is integral with the twist collar 20 and thus rotates with it. Since the cam structure 22 includes surfaces which engage the balls 18, the cam structure desirably is made from a material which resists wear. If desired, both the twist collar 20 and the cam structure 22 may be made of the same wear resistant material. One suitable material is powdered metal. In order to reduce the cost for the coupling device, the twist collar may be made of a different material such for example as plastic with the cam structure 22 being made of powdered metal. With such construction the powdered metal cam structure is molded with the twist collar 20 so that they will be permanently fixed to each other. One method of doing this is to utilize two plastic rings placed on opposite sides of the powdered metal cam structure 22 so that the powdered metal cam structure 22 forms an insert bonded to the interior of the twist collar 20. The plastic material for molding the twist collar 20 may be any suitable plastic such as polypropylene or a hard impact plastic.

In the preferred embodiment illustrated herein the predetermined angle of rotation for the twist collar is an acute angle. While this angle may vary, it is preferably about 62°. As pointed out above the coupling device of the present invention utilized a single ball 18 for engaging a single cam surface 22*b* on the cam structure 22 for locking the ball within the groove 14*a* of the shaft 14 for preventing axial movement between the shaft and the internally splined member 16 when the coupling device 10 is in the locked position as shown in FIG. 4B. By using the single locking ball to accomplish the locking feature, it is assured that the ball will be tightly engaged within the groove 14*a* of the shaft. If all three balls were utilized in this fashion, the wear on associated parts makes it difficult to ensure this tight lock relationship between the parts during the predetermined angle of rotation by the torsion spring. The three balls do however contribute to ease in installing the coupling device on the drive shaft.

While a preferred embodiment of the invention has been described and illustrated, it is to be understood that further modifications thereof may be made within the scope of the appended claims without departing from the spirit of the invention.

What is claimed is:

1. A coupling device suitable for connecting an externally splined shaft having a circumferential groove therein to an internally splined member comprising:

an internally splined member having a plurality of radial openings in the sides thereof, a plurality of balls carried by the respective openings in said internally splined member for protrusion between the splines into the groove in the externally splined shaft, a twist collar positioned on said internally splined member and rotatable through a predetermined angle relative thereto, said twist collar having therein cam structure extending around the interior periphery of said twist collar, a plurality of dwells in said cam structure at spaced locations corresponding to the plurality of radial openings in the sides of the internally splined member, a single inclined cam surface on said cam structure, said single inclined cam surface interconnecting two adjacent dwells, said single inclined cam surface being positioned to engage only one of said balls during rotation of said twist collar to force said one ball into the groove in the externally splined shaft and insure that the one ball will be tightly engaged within the groove of the shaft, and a torsion spring having one end connected to said internally splined member and the other end of said torsion spring being connected to said twist collar, said torsion spring being constructed for rotation through said predetermined angle, said torsion spring stopping against first stop structure to permit the operator to determine how far to rotate the twist collar to cause said balls to be aligned with said dwells in the insert before bringing the internally splined member into engagement with the externally splined shaft and said torsion spring stopping against second stop structure when rotated in the opposite direction so that the cam structure is prevented from rotating past said second stop in the driving direction after the twist collar has been released by the operator and said cam surface has forced said one ball into the groove in the externally splined shaft thereby preventing axial movement between the shaft and the internally splined member.

2. A coupling device according to claim 1 wherein said cam structure is integral with said twist collar.

3. A coupling device according to claim 1 wherein said cam structure comprises an insert molded within said twist collar.

4. A coupling device according to claim 1 wherein said cam structure is made of a powdered metal.

5. A coupling device according to claim 1 wherein said twist collar is made of plastic material and said cam structure is an insert made of a powdered metal molded within said twist collar.

6. A coupling device according to claim 1 wherein said torsion spring is constructed for rotation through a predetermined acute angle.

7. A coupling device according to claim 6 wherein said predetermined angle is about 62°.

8. A coupling device according to claim 1 wherein said torsion spring is positioned on said internally splined member between the outer surface thereof and the inner surface of said twist collar, said torsion spring stopping against the inner surface of the twist collar at installation to provide said first stop structure and said torsion spring stopping against the outer circumference of the internally splined member to provide said second stop structure.

9. A coupling device suitable for connecting an externally splined shaft having a circumferential groove therein to an internally splined member comprising:

an internally splined member having a plurality of radial openings in the sides thereof, a plurality of balls carried by the respective openings in said internally splined member for protrusion between the splines into the groove in the externally splined shaft, a twist collar positioned on said internally splined member and rotatable through a predetermined angle relative thereto, said twist collar having therein cam structure extending around the interior periphery of said twist collar, a plurality of dwells in said cam structure at spaced locations corresponding to the plurality of radial openings in the sides of the internally splined member, a single inclined cam surface on said cam structure, said single inclined cam surface interconnecting two adjacent dwells, said single inclined cam surface being positioned to engage only one of said balls during rotation of said twist collar to force said one ball into the groove in the externally splined shaft and insure that the one ball will be tightly engaged within the groove of the shaft, and, a torsion spring having one end connected to said internally splined member and the other end of said torsion spring being connected to said twist collar, said torsion spring being constructed for rotation through said predetermined angle.

* * * * *